(12) United States Patent
Enthaler et al.

(10) Patent No.: US 9,248,743 B2
(45) Date of Patent: Feb. 2, 2016

(54) MOTOR VEHICLE WITH A CONTROL DEVICE FOR AN EXTRAVEHICULAR COMPUTER SYSTEM

(71) Applicant: AUDI AG, Ingolstadt (DE)

(72) Inventors: Achim Enthaler, Ingolstadt (DE); Martin Roehder, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/404,779

(22) PCT Filed: May 25, 2013

(86) PCT No.: PCT/EP2013/001551
§ 371 (c)(1),
(2) Date: Dec. 1, 2014

(87) PCT Pub. No.: WO2013/178346
PCT Pub. Date: Dec. 5, 2013

(65) Prior Publication Data
US 2015/0149035 A1 May 28, 2015

(30) Foreign Application Priority Data
Jun. 1, 2012 (DE) .......................... 10 2012 010 887

(51) Int. Cl.
*B60K 37/06* (2006.01)
*H04L 29/08* (2006.01)
(52) U.S. Cl.
CPC ................ *B60K 37/06* (2013.01); *H04L 67/12* (2013.01); *B60K 2350/906* (2013.01)

(58) Field of Classification Search
USPC ............................................ 701/36
See application file for complete search history.

(56) References Cited

U.S. PATENT DOCUMENTS

| 6,472,771 | B1 | 10/2002 | Frese et al. | |
|---|---|---|---|---|
| 7,574,018 | B2 * | 8/2009 | Luo | 382/103 |
| 8,457,853 | B2 | 6/2013 | Feucht | |
| 2007/0069913 | A1 * | 3/2007 | Hatten et al. | 340/691.1 |
| 2007/0213092 | A1 * | 9/2007 | Geelen | 455/556.1 |
| 2010/0017236 | A1 * | 1/2010 | Duddle et al. | 705/4 |
| 2010/0161169 | A1 * | 6/2010 | Ramanathan et al. | 701/33 |
| 2012/0053778 | A1 * | 3/2012 | Colvin et al. | 701/29.4 |

FOREIGN PATENT DOCUMENTS

| DE | 19935893 | 2/2001 |
|---|---|---|
| DE | 102004019781 | 11/2005 |
| DE | 102008019288 | 10/2009 |
| DE | 102012010887 | 6/2012 |

(Continued)

OTHER PUBLICATIONS

English language International Search Report for PCT/EP2013/001551, mailed Sep. 16, 2013, 2 pages.

(Continued)

*Primary Examiner* — Thomas Tarcza
*Assistant Examiner* — Alex C Dunn
(74) *Attorney, Agent, or Firm* — Staas & Halsey LLP

(57) ABSTRACT

A motor vehicle has a control device that is designed to change over an operating state of an extravehicular computer system for office applications between an active state, in which the computer system executes at least one piece of office application software, and a passive state, in which the computer system is deactivated.

20 Claims, 1 Drawing Sheet

(56) References Cited

FOREIGN PATENT DOCUMENTS

| | | |
|---|---|---|
| EP | 1369306 | 12/2003 |
| EP | 1494106 | 1/2005 |
| EP | 2151737 | 2/2010 |
| WO | 03/036805 | 5/2003 |
| WO | PCT/EP2013/001551 | 5/2013 |

OTHER PUBLICATIONS

WIPO English language translation of the International Preliminary Report on Patentability for PCT/EP2013/001551, mailed Dec. 18, 2014, 7 pages.

* cited by examiner

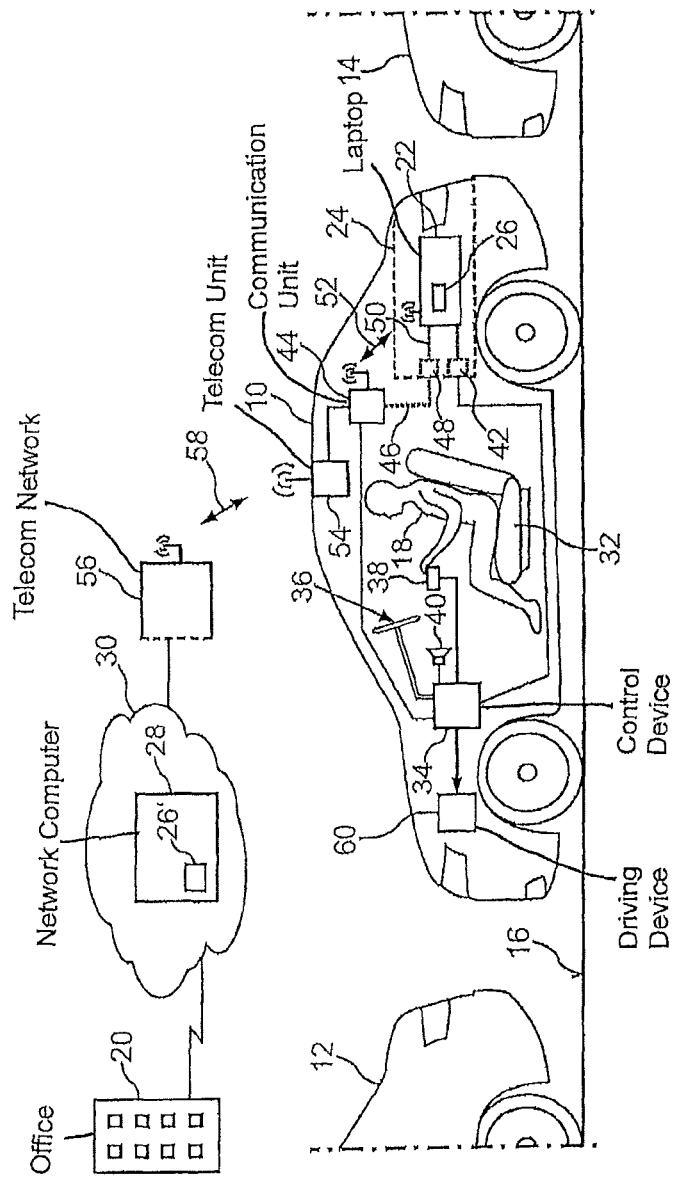

MOTOR VEHICLE WITH A CONTROL DEVICE FOR AN EXTRAVEHICULAR COMPUTER SYSTEM

CROSS REFERENCE TO RELATED APPLICATIONS

This application is based on and hereby claims priority to International Application No. PCT/EP2013/001551 filed on May 25, 2013 and German Application No. 10 2012 010 887.7 filed on Jun. 1, 2012, the contents of which are hereby incorporated by reference.

BACKGROUND

The invention relates to a motor vehicle having a control device that can be used to control an extravehicular computer system. The invention also includes a method for assisting a driver in accomplishing office work in the motor vehicle.

In this regard, the related art, for example DE 10 2008 019 288 A1, discloses the practice of an operator controlling a mobile telephone by a control unit of a motor vehicle by virtue of an operator control and display structure of the mobile telephone—which structure displays telephone numbers stored in the mobile telephone, for example—being adopted on a touchscreen of the motor vehicle, i.e. a touch-sensitive screen. This allows a driver of the motor vehicle to select a telephone number on the touchscreen, which is arranged centrally in the central console, during the journey and to use the hands-free installation of the motor vehicle to make a call.

According to the related art today, however, a driver has no way of working on a computer during the journey and thus of using his travelling time productively. With the establishment of autonomous vehicles that drive the vehicle independently, for example in stop-and-go traffic or during a queue, it is conceivable for the driver also to wish to use time in the vehicle as work time in future. If a driver is in a queue today, he is compelled to place an office computer, for example a laptop or a tablet PC, on his lap in front of the steering wheel or on the passenger seat. If the queue breaks up and the driver then needs to immediately return his attention to the traffic, he leaves the work computer unattended. If the vehicle then suddenly needs to be slowed down, this can lead to the work computer being damaged because it slides unsecured in the vehicle during braking.

SUMMARY

It is one possible object to provide a way of making it easier for a driver to accomplish office work in his motor vehicle.

The inventors propose a motor vehicle that has a control device that is designed to change over an operating state of an extravehicular computer system for office applications between an active state, in which the computer system executes at least one piece of office application software, and a passive state, in which the computer system is deactivated. By way of example, the control device may comprise a controller of the motor vehicle. The inventors also propose a method that provides for the control device to at least activate the extravehicular computer system.

The computer system is particularly at least one of the following appliances, a laptop, a notebook, a tablet PC and a network computer with what is known as a cloud working environment, said network computer being able to be controlled by an operator via a computer network, for example the Internet. In the present case, a cloud working environment is understood to mean a network service that is provided by the network computer and that allows a work result, for example the writing of a letter or the creation of presentation slides, to be stored in the network computer and then to be synchronized with further computer systems, i.e. allows the work result to be transmitted to these further computer systems. For the remainder of the appliances cited in the above list, it does not necessarily matter where they are situated. By way of example, provision may be made for even a laptop or a tablet PC that is situated in the trunk or in a briefcase on a rear seat or even at a place outside the motor vehicle to be activated by the control device. Alternatively, the proposed motor vehicle may also have provision for a docking station to be provided in which the appliance is fixed.

The motor vehicle has the advantage that the control device provides an additional interface in the vehicle that allows an external computer system to be activated or deactivated in the vehicle or from the vehicle. By way of example, it is thus possible for a computer system placed in the trunk of the vehicle to be activated or deactivated during the journey. This is advantageous particularly when the driver has placed a switched-off extravehicular computer system, that is to say his laptop, for example, into the trunk at the beginning of the journey, for example. If the driver then gets into stop-and-go traffic, he does not need to stop the vehicle once again during the journey in order to go to the trunk and activate the laptop there. Equally, it may be possible for the laptop also to be deactivated by the control device when the queue breaks up, for example, and the driver wishes to continue his journey. In this connection, a development of the method provides for the computer system to be automatically deactivated by the control device if a predetermined shutdown criterion is met. In connection, deactivation means both complete switching-off of the appliance and transfer of the appliance to a standby state, as known per se from the related art in connection with electronic appliances.

By way of example, the shutdown criterion may be that the control device has not recognized any operator control activity from the driver relating to the computer system for a predetermined period of time, for example 10 minutes. It can then be assumed that the driver is no longer occupied with the computer system and the latter can therefore be deactivated for the purposes of saving power, for example. A speed of travel profile can also provide an indication of whether the driver is actually occupied with the computer system. In this case, the criterion taken as a basis may be a threshold value for an average speed, for example. In general, the criterion needs to be chosen such that if said criterion is met then it can be assumed that the driver is no longer working with the computer system or continued work risks the safety of the driver.

In order to allow the control device to be able to be used to change the operating state of the computer system, one embodiment of the motor vehicle provides for the motor vehicle to have a connection device for providing an operating voltage for the computer system. In this case, the connection device is embodied such that the operating voltage is produced at an electrical port for the computer system, for example a receptacle outlet, on the basis of a control signal. The control signal is received by the connection device from the aforementioned control device. In this embodiment, the latter is designed to change the operating state of the computer system by altering the operating voltage by producing an appropriately predetermined control signal, that is to say switching the power supply for the computer system either on or off. Instead of a receptacle outlet, provision may also be made, by way of example, for the power supply to be altered in a docking station for the computer system. Switching the operating voltage results in the advantage that the motor vehicle allows complete control over the electric power discharged from the motor vehicle to the extravehicular computer system.

A further embodiment of the motor vehicle provides for the electrical port to be arranged in a trunk of the motor vehicle. In that case, a computer system connected thereto advantageously takes up no space in the passenger compartment.

According to another development of the motor vehicle, said motor vehicle has a communication device that is designed to interchange data with the computer system. By way of example, the communication device may be a WLAN router (WLAN—Wireless Local Area Network) or else a wired LAN appliance (LAN—Local Area Network). The communication device may also provide a USB (Universal Serial Bus) or communication based on the Bluetooth standard. In the case of this development of the motor vehicle, the control device is then designed to change the operating state by transmitting a wake-up signal and/or a switch-off signal to the computer system via the communication device. In other words, in this embodiment, the interface for the external computer system is used to send an appropriate wake-up pulse or a shut-down pulse. This development has the advantage that the operating state can be changed independently of a power supply for the computer system, and, by way of example, it is also possible for the aforementioned network computer to be controlled via an appropriate network connection.

A further embodiment of the motor vehicle provides for the control device to be designed to independently detect an availability of the computer system and to indicate the result of the detection to a user of the motor vehicle via a display device, that is to say on a screen in the central console, for example. A driver can then check from the driver's seat which computer systems are available to him for accomplishing office work.

In this connection, one development of the motor vehicle provides for the control device to be designed to change the operating state of the computer system on the basis of the operator control action that a user carries out on an operator control device of the motor vehicle. The driver can then activate and/or deactivate the computer system manually according to his own requirements. By way of example, it may be possible for the driver to select an appropriate function in an operator control menu of an infotainment system of the motor vehicle.

In the "computer system active" mode, expediently available operator control elements and output appliances of the motor vehicle are then likewise automatically activated or their function conditioned for operator control of the computer system. In this regard, one embodiment of the motor vehicle provides for the motor vehicle to have an operator control device designed for the operator control of at least one motor vehicle component, for example a radio, in a first operating state. Preferably, the operator control device comprises at least one of the following input appliances: a touchpad, a gesture recognition system, a keyboard, a control stalk, a steering wheel, a pedal, a rotary/push control, a switch on an instrument of the motor vehicle. In this case, the operator control device is designed to be able to change over between this first and a second operating state. In the second operating state, the operator control device transmits control signals to the computer system instead of to the at least one motor vehicle component. This advantageously requires no additional operator control device to be provided for the operator control of the computer system in the motor vehicle. The operator control device for the operator control of the at least one motor vehicle component can instead simply be changed over to the second operating state and used for the operator control of the computer system.

In relation to use of an output appliance of the motor vehicle, one development of the motor vehicle provides for an output device of the motor vehicle to output a signal from at least one motor vehicle component to a user of the motor vehicle in a first operating state. Expedient examples of an output appliance that the output device may comprise are a screen in a central console of the motor vehicle, a head-up display apparatus that projects a display onto the windscreen in front of the driver, a screen of a combined instrument behind the steering wheel of the motor vehicle, a display apparatus integrated into a front window or a side window of the motor vehicle, a loudspeaker of the motor vehicle. According to the development of the motor vehicle, the output device is designed to be able to change over between the first and a second operating state, in which the output device receives at least one signal from the computer system, and outputs it to the user, instead of a signal from the at least one motor vehicle component or in addition to this signal. This advantageously allows the driver to be able to view a display of the computer system, for example a desktop, or a display of a text program or of an e-mail program, by the output device. One way of realizing such a display is to use VNC (Virtual Network Computing).

It is particularly advantageous if the motor vehicle additionally has a driving device that is designed to drive the motor vehicle in an autonomous driving mode independently without any action from the driver, i.e. to perform longitudinal and transverse guidance for the motor vehicle independently. In that context, longitudinal guidance is intended to be understood to mean the acceleration and deceleration of the vehicle, and transverse guidance is intended to be understood to mean the steering of the vehicle. According to this development of the motor vehicle, the control device is then designed to change over the motor vehicle between a driving mode, in which the motor vehicle can be driven by the driver, and an office work mode. In this case, changeover to the office work mode comprises activation of the driving device, so that the motor vehicle is then driven by the driving device independently, and activation of the computer system. The driver can then advantageously turn his attention away from the traffic completely and devote himself to accomplishing office work by the computer system.

In connection with one refinement of the office work mode, a development of the motor vehicle provides for the activation of the office work mode furthermore to comprise at least one of the following settings by the control device: positioning of the driver's seat; alteration of the position of the steering wheel, which can be moved away from the driver, for example, so that he has greater clearance for movement; a setting for lighting in the passenger compartment; the folding-back or retraction of a pedal, which then increases the available free leg room for the driver. These measures individually or in combination allow an improvement in the ability of the driver to concentrate when accomplishing office activity and also in comfort.

Developments of the method have features that correspond to the features of the developments of the motor vehicle as have already been described. For this reason, the corresponding features of the developments of the method are not described again at this juncture.

BRIEF DESCRIPTION OF THE DRAWINGS

These and other objects and advantages of the present invention will become more apparent and more readily appreciated from the following description of the preferred embodiments, taken in conjunction with the accompanying drawings of which:

the single FIGURE (FIG.) shows a schematic illustration of a potential embodiment of the proposed motor vehicle.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE shows a motor vehicle 10, which may be a car, for example. For the explanation of the example, it may be assumed that the motor vehicle 10 is in a queue with further motor vehicles 12, 14, is on a stop-and-go journey or is travelling in a convoy on a road 16. Driving the motor vehicle 10 therefore requires only a low level of attentiveness from a driver 18 of the motor vehicle 10. The driver 18 therefore wishes to accomplish office work during the journey, the result of the work being intended to be available to him later in his office 20 or at home, for example.

Before commencing the journey, the driver 18 has placed a laptop 22 into a trunk 24 of the motor vehicle 10. The laptop 22 has a piece of office application software 26 installed that he can use to accomplish the office work. The office application software 26 is, by way of example, a word processing program, an e-mail program, a program for designing graphics for presentations, a spreadsheet program, a drawing program, a CAD program, an audio program for editing music data or a piece of access software for setting up a data link to the office 20, that is to say a piece of VPN software (VPN—virtual private network), for example. Instead of the laptop 22, the office application software 26 may also be installed on a tablet PC or a smartphone.

The appliance for the office work, that is to say, in the present example, the laptop 22, does not have to be in the trunk 24. It may also be situated at a different location in the motor vehicle 10, for example in a glove compartment. Provision may also be made for the appliance to be situated outside the motor vehicle 10. Equally, provision may be made for the driver 18 to be able to use a network computer 28 that provides a piece of office application software 26', similar to the office application software 26, that the driver 18 can use as a cloud network service via a network connection of the internet 30.

When the driver 18 uses the office application software 26, he can store the work result on the laptop 22, for example, and take the latter with him into the office 20 after the journey has ended in order to use the work result in the office. When the driver 18 uses the office application software 26' of the network computer 28, the driver 18 can likewise access the work result from the office 20 after the journey has ended by synchronizing the data stored in the network computer 28 with an office computer (not shown) in the office 20.

In the case of the motor vehicle 10, the driver 18 has the possibility of controlling the laptop 22 or one of the other appliances described from his driver's seat 32. In addition or alternatively, the driver 18 may have the possibility of also controlling the office application software 26' of the network computer 28 from his driver's seat 32. To this end, the motor vehicle 10 has a control device 34 that, by way of example, may comprise a controller that is part of an infotainment system of the motor vehicle 10. The control device 34 is coupled to at least one screen 36 of the motor vehicle 10, for example a screen of the infotainment system or a screen of a combined instrument of the motor vehicle 10 or of a head-up display unit or a display apparatus integrated in a front window or in a side window of the motor vehicle (10). By way of example, said display apparatus may comprise a film with liquid crystals. Furthermore, the control device 34 is coupled to at least one operator control element 38 of the motor vehicle 10. By way of example, the operator control element 38 may be a touchpad, a gesture recognition system or a keyboard. Furthermore, the control device 34 may be coupled to a loudspeaker 40 of an audio installation (not shown further) of the motor vehicle 10.

The control device 34 is set up to activate an extravehicular computer system. In the present example, the control device 34 activates the laptop 22. To this end, the laptop may be connected, by way of example, to a power supply device 42 of the motor vehicle 10, for example a receptacle outlet or a power supply for a docking station to which the laptop 22 may be connected.

In this case, the control device 34 is designed to switch the power supply device 42 by transmitting a control signal, so that the laptop 22 is supplied with a supply voltage. This then activates the laptop 22, so that it executes the office application software 26.

The motor vehicle 10 may also have a communication device 44, for example a router for a WLAN or an LAN or a USB controller or a Bluetooth communication unit. For the purposes of wired connection 46 to the communication unit 44, the laptop 22 may have a communication port 48 to which a data cable 50 from the laptop 22 may be connected. Provision may also be made for the laptop 22 to use a radio link 52 to communicate with the communication unit 44. For the purposes of activating the laptop 22, provision may accordingly be made for the control unit 34 to send a wake-up signal to the laptop 22 via the communication unit 44, whereupon the laptop 22 then executes the office application software 26.

Provision may also be made for the laptop 22 to use the communication unit 44 to set up a network connection to the Internet 30, to which end the communication unit 44 may be coupled to a telecommunication unit 54, for example. The telecommunication unit 54 may, by way of example, be designed to communicate with a telecommunication network 56 via a radio link 58. The telecommunication network 56 may be one based on the GSM, UMTS or LTE standard, for example.

If the office work is meant to be accomplished by the network computer 28, provision may be made for the control device 34 to use the communication unit 44 and the telecommunication unit 54 to send an appropriate wake-up signal to the network computer 28. Other external computer systems can also be activated in this way.

Provision may be made for a selection of the available computer systems, that is to say in this case the laptop 22 and the network computer 28, for example, to be displayed to the driver in a menu that can be displayed on the screen 36, for example. In this case, a corresponding menu item "Portable computer system" can use the values "not recognized" (grey) or "recognized" (red) to indicate the availability of different computer systems that have been automatically recognized by the control unit 34 either in an external network, such as in this case the Internet 30, or else inside the motor vehicle 10, such as in this case the laptop 22.

By selecting one of the recognized computer systems, this computer system can then be taken to from the "inactive" or "standby" operating mode into the "active" operating mode, as a result of which the office application software 26 or 26' is then executed.

Following activation of the computer system, the driver 18 may have the possibility of also controlling the computer system from the driver's seat 32. To this end, provision may be made for the control device 34 to use the screen 36 or another screen of the motor vehicle 10 to display a screen content that displays a screen output from the office application software 26 or 26'. In other words, the driver 18 can use the screen 36 instead of the screen (not shown) of the laptop 22. The transmission of the screen content from the laptop 22 to the control device 34 may be realized by VNC, for example. Accordingly, provision may be made for the control device 34 to use the loudspeaker 40 to output sound signals from the laptop 22 or from the network computer 28 to the driver 18.

To allow operator control of the office application software 26, 26', provision may be made for the driver 18 to use the operator control element 38 and further operator control elements of the motor vehicle. To this end, the control device 34 receives the signals produced by the operator control element 38 and the remainder of the operator control elements and forwards them via the communication unit 44 to the laptop 22 or network computer 28. The driver 18 thus does not need to use a computer mouse or a keyboard on the laptop 22 itself, for example. Instead, the input and output for operator control of the office application software 26, 26' is made possible in the case of the motor vehicle 10 by the control device 34 by components of the motor vehicle 10 itself, that is to say in the present example by the operator control element 38, the screen 36 and the loudspeaker 40, for example.

Further conceivable functions for improving the workstation in the motor vehicle 10 are the automatic setting of a position of the driver's seat 32, of a steering wheel (not shown), of the lighting in the passenger compartment of the motor vehicle 10 and the retraction of the gas pedal and/or brake pedal.

The motor vehicle 10 may also have provision for the operator control of the laptop 22 or of the network computer 28 to be combined with a piloted journey in which the driver 18 needs to perform neither longitudinal nor transverse guidance for the motor vehicle 10. To this end, the motor vehicle 10 may have a driving device 60 for autonomous driving operation. By way of example, the driving device 60 may comprise a controller of the motor vehicle 10. In this case, the operator control of the extravehicular computer system (e.g. laptop 22 or network computer 28) may be combined with the piloted journey such that the driver 18 first of all selects autonomous driving operation, as a result of which the control device 34 then activates the driving device 60, and then the extravehicular computer system is subsequently activated by the control device 34 automatically or else by a further selection by the driver 18.

This combination can be rounded up further still by virtue of the driver 18 being provided with the option of changing over the motor vehicle 10 from a driving mode to a working mode or office work mode. While this requires the driver 18 to drive the motor vehicle 10 himself in driving mode, the activation of the working mode can comprise the control device 34 automatically activating both the driving device 60 and the extravehicular computer system, that is to say the laptop 22 or the network computer 28, and possibly making the further automatic settings already described.

The control device 34 may also provide for the deactivation of the laptop 22, so that the office application software 26 is terminated and the data with the work results are safely stored. There may also be provision for the network computer 28 to be deactivated by the control device 34. In this case, deactivation means that a network connection to the network computer 28 is terminated and a signal for storing the work results produced with the office application software 26' is transmitted to the network computer 28 beforehand.

The deactivation can take place automatically on the basis of a predetermined deactivation criterion. By way of example, the return of the motor vehicle 10 from the working mode to the driving mode can be used as such a criterion. A further criterion may be that the deactivation takes place if the driver 18 does not use the office application software 26, 26' for a predetermined time.

Manual deactivation by the driver 18 may also be realized by appropriate operator control options (selection of an appropriate menu item in the operator control menu of the control device 34 or operation of an operator control element provided for this purpose). In this case, manual deactivation is implemented such that the driver 18 can concentrate on the traffic during this and does not need to take both hands from the steering wheel of the motor vehicle 10. The driver can thus continue the journey in the motor vehicle 10 without still needing to perform a complicated operator control action, which could distract him from the traffic, beforehand in order to deactivate the office work software 26, 26'. Since he also does not have to place any specific operator control elements, such as a computer mouse, or even the laptop 22 itself, on his lap or on the passenger seat in order to control the office work software 26, 26', the driver can also quickly interrupt his office activity at any time and undertake driving of the motor vehicle 10 himself without there subsequently being the risk that the laptop 22 will be damaged or operator control elements will slide uncontrollably in the motor vehicle 10, for example when the latter is braked.

The example shows how an external computer system (e.g. a laptop) can be coupled to the vehicle and can be activated and deactivated by the driver or by a control device of the vehicle during the journey using a defined interface. This additional function will in the future allow the driver to use the preset interface during the journey to influence the operating state of an external computer system coupled to the vehicle. By developing this approach, it is possible to use the vehicle as an input and output appliance of the external computer system in the manner described.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A motor vehicle comprising:
 a communication device to interchange data with an extravehicular computer system for office applications;
 an operator input device having a first operating mode for operator control of at least one motor vehicle component by transmitting control signals to the at least one motor vehicle component, and having a second operating mode for operator control of the computer system by transmitting control signals to the computer system instead of to the at least one motor vehicle component; and
 a control device to change over an operating state of the computer system based on an operator control action by a user on the operator input device, the computer system being changed between an active state, in which the computer system executes at least one piece of office application software, and a passive state, in which the computer system is deactivated, the control device changing the operating state of the computer system by transmitting a wake-up signal and/or a switch-off signal to the computer system via the communication device, the operator input device operating in the first and second operating modes respectively in the passive and active states of the computer system.

2. The motor vehicle as claimed in claim 1, wherein
the computer system is at a location not reachable by the user, and
the operator input device replaces as an input device, a mouse and/or a keyboard of the computer system.

3. The motor vehicle as claimed in claim 1, wherein
a connection device provides an operating voltage for the computer system,
the operating voltage is produced at an electrical port for the computer system based on the wake-up signal and/or the switch-off signal from the control device, and
the control device changes the operating state of the computer system by altering the operating voltage for the computer system.

4. The motor vehicle as claimed in claim 3, wherein the electrical port is arranged in a trunk of the motor vehicle.

5. The motor vehicle as claimed in claim 1, wherein the communication device comprises a computer network interface, a USB interface or a Bluetooth interface.

6. The motor vehicle as claimed in claim 1, wherein the control device independently detects an availability of the computer system, and the control device indicates availability of the computer system to the user via a display device.

7. The motor vehicle as claimed in claim 1, wherein
the operator input device comprises at least one a touchpad, a gesture recognition system, a keyboard, a control stalk, a steering wheel, a pedal, a rotary/push control, and a switch on an instrument of the motor vehicle.

8. The motor vehicle as claimed in claim 1, further comprising an output device having first and second operating states, to output a signal from the at least one motor vehicle component to the user in the first operating state, to change over between the first and second operating states, to receive a signal from the computer system in the second operating state, and to output at least the signal from the computer system to the user in the second operating state.

9. The motor vehicle as claimed in claim 8, wherein the output device comprises at least one of a screen in a central console of the motor vehicle, a head-up display apparatus, a screen of a combined instrument, a display apparatus integrated in a front window or a side window of the motor vehicle, and a loudspeaker of the motor vehicle.

10. The motor vehicle as claimed in claim 8, wherein in the second operating state, the output device displays a screen content comprising a screen output of the office application software of the computer system.

11. The motor vehicle as claimed in claim 8, wherein
the output device comprises a display screen, and
in the second operating state, the display screen presents the user with a desktop display, a text program display and/or an email program display for the computer system.

12. The motor vehicle as claimed in claim 11, wherein
the computer system is at a location not reachable by the user, and
the operator input device replaces as an input device, a mouse and/or a keyboard of the computer system.

13. The motor vehicle as claimed in claim 12, wherein the operator input device and the output device provide Virtual Network Computing to the user.

14. The motor vehicle as claimed in claim 1, wherein
the user is a driver of the motor vehicle,
a driving device operates in an autonomous driving mode, in which longitudinal and transverse guidance for the motor vehicle is performed independently without any action from the driver, and
the control device switches the motor vehicle between a manual driving mode, in which the motor vehicle is driven by the driver, and an office work mode, which activates the autonomous mode of the driving device and activates the computer system.

15. The motor vehicle as claimed in claim 14, wherein in the office work mode, the control device also changes settings for at least one of a position of a driver's seat, a position of a steering wheel, lighting in a passenger compartment, and a folding-back or retraction of a pedal.

16. The motor vehicle as claimed in claim 14, wherein when the office work mode is deactivated, the control device deactivates the computer system, deactivates the driving device and switches the motor vehicle to the manual driving mode.

17. The motor vehicle as claimed in claim 14, wherein
the autonomous mode of the driving device is activated in stop-and-go traffic, and
the control device deactivates the computer system, deactivates the driving device and switches the motor vehicle to the manual driving mode when the traffic breaks up.

18. A method for assisting a driver in accomplishing office work in a motor vehicle, comprising:
using a communication device to interchange data with an extravehicular computer system for office applications;
receiving an input from the driver at an operator input device, the operator input device having a first operating mode for operator control of at least one motor vehicle component of the motor vehicle and having a second operating mode for operator control of the computer system by transmitting control signals to the computer system instead of to the at least one motor vehicle component;
using a control device to change an operating state of the computer system based on an operator control action by the driver on the operator input device, the computer system being changed between an active state, in which the computer system executes at least one piece of office application software, and a passive state, in which the computer system is deactivated, the control device changing of the operating state of the computer system by transmitting a wake-up signal and/or a switch-off signal to the computer system via the communication device; and
conditioning the operator input device for the operator control of the computer system by switching the operator input device to the second operating mode when the computer system is switched to the active state.

19. The method as claimed in claim 18, wherein the computer system comprises at least one of a laptop, a tablet personal computer, and a network computer with a cloud working environment.

20. The method as claimed in claim 18, wherein the computer system is automatically deactivated by the control device if a predetermined shutdown criterion is met.

* * * * *